(12) United States Patent
Phua et al.

(10) Patent No.: US 7,289,689 B2
(45) Date of Patent: Oct. 30, 2007

(54) COMBINATORIAL POLARIZATION SCRAMBLERS FOR MANY SEGMENT PMD EMULATOR

(75) Inventors: Poh-Boon Phua, Singapore (SG); Erich P. Ippen, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/210,319

(22) Filed: Aug. 24, 2005

(65) Prior Publication Data
US 2007/0047866 A1    Mar. 1, 2007

(51) Int. Cl.
*G02B 6/00* (2006.01)
*H04J 14/02* (2006.01)

(52) U.S. Cl. .......................................... 385/11; 398/81
(58) Field of Classification Search .................. 385/11; 398/81
See application file for complete search history.

(56) References Cited

U.S. PATENT DOCUMENTS

| 5,237,388 A * | 8/1993 | Hirano et al. ............... 356/491 |
| 2001/0024538 A1 | 9/2001 | Khosravani et al. | |
| 2001/0050815 A1 * | 12/2001 | Ishihara et al. ............. 359/566 |
| 2005/0200941 A1 * | 9/2005 | Yao ........................... 359/301 |

FOREIGN PATENT DOCUMENTS

| WO | WO 03021314 | 3/2003 |
| WO | WO 2006094407 | 9/2006 |

OTHER PUBLICATIONS

Phua et al., "Combinatorial Polarization Scramblers for Many-Segment PMD Emulator" IEEE Photonics Technology Letters, vol. 17, No. 2, Feb. 2005, pp. 405-407.
Lize et al., "Novel First and Second Order Polarization Mode Dispersion Emulator" 2005 Optical Fiber Communications Conference Technical Digest IEEE Piscataway, NJ, USA, vol. 4, Mar. 2005, pp. 1-3.
Djupsjobacka, "Impact of Polarization Controllers in Polarization-mode Dispersion Emulators" Journal of Optical Communications, 23 (2002, pp. 195-199.
Chipman et al., "High Order polarization mode dispersion emulator" Optical Engineering, Society of Photo-Optical Instrumentation Engineers, vol. 41, No. 5, Oct. 2002, pp. 932-937.

* cited by examiner

*Primary Examiner*—Brian Healy
*Assistant Examiner*—Charlie Peng
(74) *Attorney, Agent, or Firm*—Gauthier & Connors LLP

(57) ABSTRACT

A PMD emulator includes at least two polarization phase plates. The rotation matrix of the at two phase plates are varied to reduce the required number of phase-plates without reducing the number of birefringent segments used.

12 Claims, 3 Drawing Sheets

COMBINATORIAL POLARIZATION SCRAMBLERS FOR MANY SEGMENT PMD EMULATOR

BACKGROUND OF THE INVENTION

The invention relates to the field of PMD emulators and in particular to a combinatorial approach to build polarization scramblers in a many-segment PMD emulator.

As the telecommunication industry continues to deploy higher bandwidth fiber optic systems, Polarization Mode Dispersion (PMD) becomes one of the major obstacles in 10 Gbit/s and higher transmission systems. The evaluation of PMD mitigation techniques requires a method of emulating the PMD of the installed fiber links, especially since "legacy" fiber with high PMD installed in the 1980's is no longer commercially available. PMD emulation has thus become an active area of research since the last few years. Much work has focused on emulating PMD using a concatenation of many birefringent segments with random coupling at each junction.

One important requirement of these emulators is that the number of segments concatenated has to be large. This is to give the key properties of a good PMD emulator which include (i) a Maxwellian distributed DGD, (ii) accurate higher-order PMD statistics and (iii) a frequency autocorrelation function that tends toward zero after a frequency range that spans a few times the bandwidth of the principle state of polarization (PSP). On the other hand, practical considerations such as the size of the emulator, the cost of building it, the ease of implementation, the complexity involved in the controls and the insertion loss often limit the number of segments to typically about 15.

A polarization scrambler placed between segments is the one of the major components that determines its cost, size and complexity. Since the number of polarization scramblers required is linearly proportional to the number of segments used, these factors scale up linearly with the number of segments. It has been demonstrated that a dynamic PMD emulator using a total of 36 squeezers (3 squeezers in each of the 12 polarization controllers) while another experiment demonstrated using 64 motors to control the 64 fiber twisters. The cost to build and the complexity to control such many squeezers are substantial.

SUMMARY OF THE INVENTION

According to one aspect of the invention, there is provided a method of forming a polarization maintaining dispersion (PMD) emulator. The method includes providing at least two polarization phase plates. Also, the method includes varying the rotation matrix of the at two phase plates.

According to another aspect of the invention, there is provided a polarization maintaining dispersion (PMD) emulator. The PMD emulator includes at least two polarization phase plates. The rotation matrix of the at two phase plates are varied to reduce the required number of phase-plates without reducing the number of birefringent segments used.

DETAILED DESCRIPTION OF THE INVENTION

The invention uses a combinatorial approach of building polarization scramblers, with the aim to reduce the required number of phase-plates without reducing the number of birefringent segments used in a many-segment PMD emulator. This approach exploits the simple principle that the rotation matrices are non-commutative and there exist a large number of combinations involving just a few phase-plates in building polarization controllers. Mathematically, $$R_i.R_j.R_k.R_l.R_m.R_n \neq R_j.R_i.R_k.R_l.R_m.R_n \neq R_k.R_j.R_i.R_l.R_m.$$
$$R_n \neq \ldots \neq R_m.R_n.R_i.R_j.R_k.R_l \quad \text{EQ. 1}$$

where R are the various rotation matrices of the phase-plates. The invention relies on varying the rotations matrices of various phase plates. Note their can be a multitude of arrangements of phase plates or other accessories to accomplish varying the rotation matrices but the essence of the invention is described in EQ. 1.

For instance, given 6 different phase-plates, one can build 6!=720 different polarization controllers. Thus, just by randomly varying the parameters of these 6 phase-plates, one can effectively "scramble" hundreds of polarization controllers. Moreover, if duplicated use of each phase-plate is allowed, the total number of possible polarization controllers can be further increased. Although these hundreds of polarization controllers can be correlated to one another, one can show that there is sufficient polarization scrambling between segments to achieve the various key properties of a good emulator.

FIGS. 1A-1D show numerical simulations of concatenating 20 birefringent segments. The birefringence of these segments is Gaussian distributed with a mean value of 1.2 ps and with a standard deviation of 20% of this mean value. The unequal length of segments is necessary to avoid the undesired periodicity in the frequency autocorrelation function of the PMD. Random combinations of 6 phase-plates are chosen to form the 19 polarization scramblers. Each phase-plate is assumed to have a fixed birefringence axis while its retardation angle is tunable. In Stokes space representation, the birefringence axes of these phase-plates are randomly chosen on the Poincaré sphere; but, once chosen, they are fixed throughout the simulation. The number of phase-plates used to form a polarization scrambler is randomly chosen from 6 to 9. It allows duplicated usage of any phase-plate. One can generate random combinations of these phase-plates to form the polarization scramblers. Once the random set of polarization scramblers is chosen, it is also fixed throughout the simulation. The retardation angles of the six phase-plates are then randomly tuned for the different realizations of the fibers.

Figure 1A:
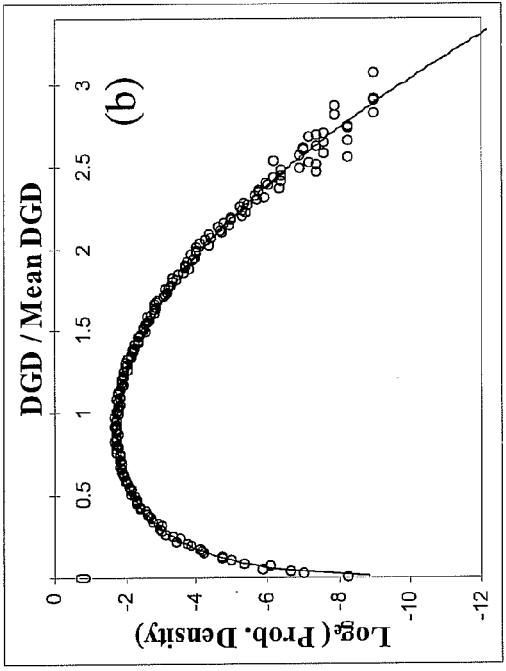
FIGS. 1A-1D are graphs demonstrating the simulated statistics of 100,000 random fiber realizations using the combinatorial polarization scramblers.
Figure 1B:
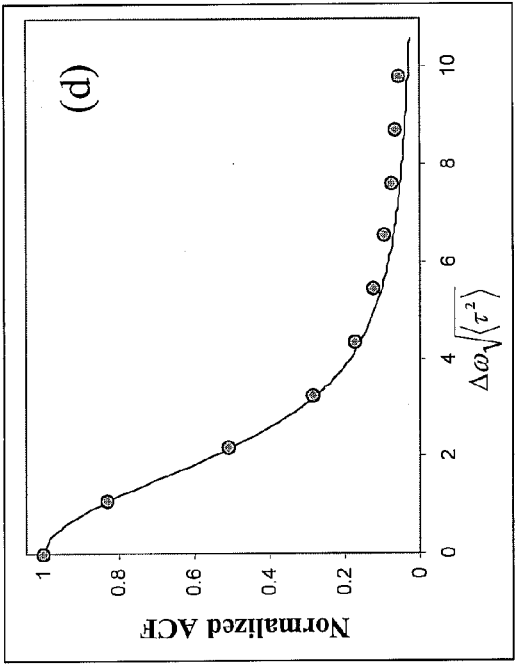
Figure 1C:
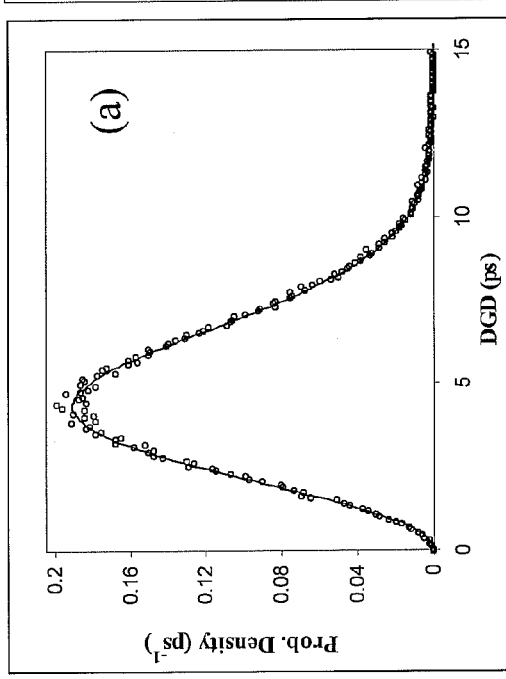
Figure 1D:
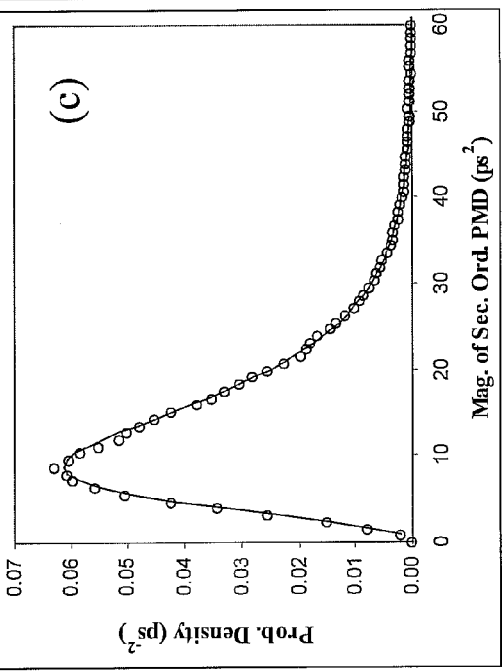

The first- and second-order PMD of the concatenation are then computed using the PMD concatenation rule as a function of frequency. 100,000 random fiber realizations are used to generate the necessary statistics, as shown in FIG. 1A where the DGD in linear scale, FIG. 1B where the normalized DGD in logarithmic scale, FIG. 1C where the magnitude of the second order PMD and FIG. 1D where the PMD frequency autocorrelation function. One can see that the simulated statistics are in good agreement with the corresponding desired distributions shown in solid line curves. In addition, FIG. 1B shows good agreement is achieved even at the tail of the DGD distribution. This result is encouraging as one can now generate the required PMD statistics using an order of magnitude fewer phase-plates. This would significantly reduce the cost, the size and the complexity of the emulator.

Figure 2:
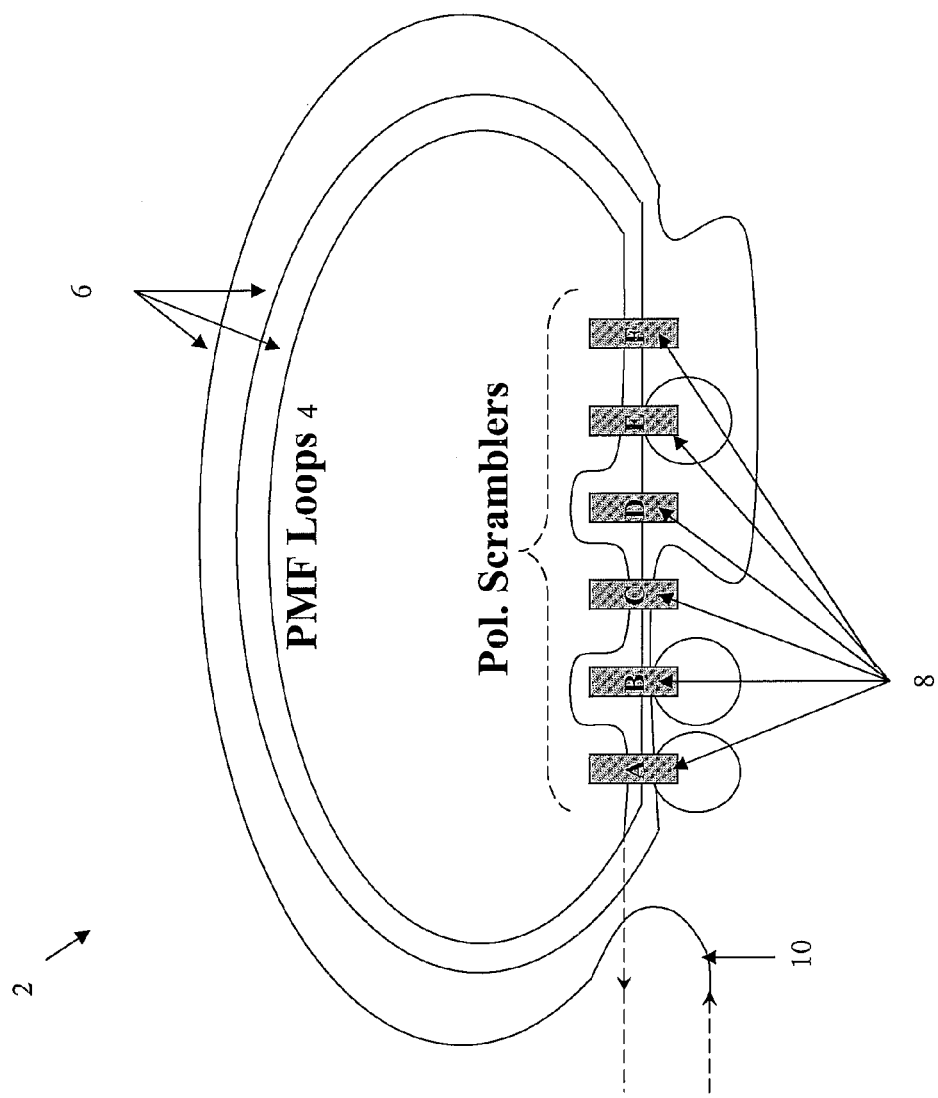
FIG. 2 is a schematic diagram of an all-fiber PMD emulator using combinatorial polarization scramblers.

There are a variety of ways to build an emulator with combinatorial polarization scramblers. FIG. 2 shows an all-fiber implementation using the fiber 4 squeezing technique. A long 3M Tiger Polarization Maintaining (PM) fiber 4 is arranged in loops 6. Between each loop 6, the fiber 4 passes through a different sequence of the six fiber squeezers 8, this equivalently creates different polarization scramblers between loops 6 of the PM fiber 4. For illustration purposes, after the first loop 10, the first polarization scrambler is built by passing through the squeezers in an arrangement C->B->B->A->A and after the second loop, the second polarization scrambler is built by passing through F->E->E->D->C->B->A and so on. One can restrict the maximum number of squeezers 8 experienced by any polarization controller to 7. This is to avoid excessive insertion loss. When a squeezer applies mechanical stress on the fiber, it induces stress birefringence and creates the equivalent of a tunable phase-plate and an effective polarization scrambling between the PM fiber loops. In the experiment, the DGD of each loop is randomly chosen with a Gaussian mean of 1.2 ps and a standard deviation 20% of this mean value. The total number of PM fiber loops is 16.

The measured loss of the emulator is 5±2 dB depending on the stress applied to the squeezers. The polarization dependent loss is ~0.2 dB. One can manually vary the stresses applied by the 6 squeezers to generate different fiber realization. For each fiber realization, one can characterize the spectrum of the PMD vectors by using the inventive technique. Instead of using optically filtered telecommunication at the output end, a Santec scanning wavelength laser can be used at the input end. The polarization of the laser is randomly scrambled with a General Photonics polarization scrambler (Polarite II) before launching into the emulator. The output polarization is measured with a HP 8509B polarimeter. From measurements of the SOP versus frequency, the spectrum can be deduced from the PMD vectors.

In this algorithm, first compute the differential output SOP vectors for the various scrambled input polarization states and find the optimum normal axis to these differential SOP vectors in a least-square sense. This gives the Principal State of Polarization (PSP) direction. Using this PSP direction, one can then determine the DGD value from the length of the differential SOP vectors. Once the information of the PMD vectors with frequency is known, the higher-order PMD can be computed. It is verified experimentally the accuracy of this characterization using well-calibrated first- and higher-order PMD sources. For each fiber realization, one can measure the PMD vectors over a range of 1440 nm to 1510 nm with a step size of 0.2 nm. This step-size corresponds approximately to the PSP bandwidth of this emulator. The measured mean DGD of the emulator is 5 ps and its corresponding PSP bandwidth is ~25 GHz.

In the experiment, it is observed that the output SOP from the emulator remains reasonably constant over a time period of more than a few minutes, which is long enough for each PMD characterization. Thus, no deliberate temperature control is used. A hundred random fiber realizations were characterized. For each fiber realization, the DGD fluctuates with wavelength while, for each wavelength, the DGD fluctuates with the fiber realizations. In general, the observed distribution of the DGD at fixed wavelength or at fixed fiber realization has a trend that approximates a Maxwellian with these limited statistics.

Figure 3A:
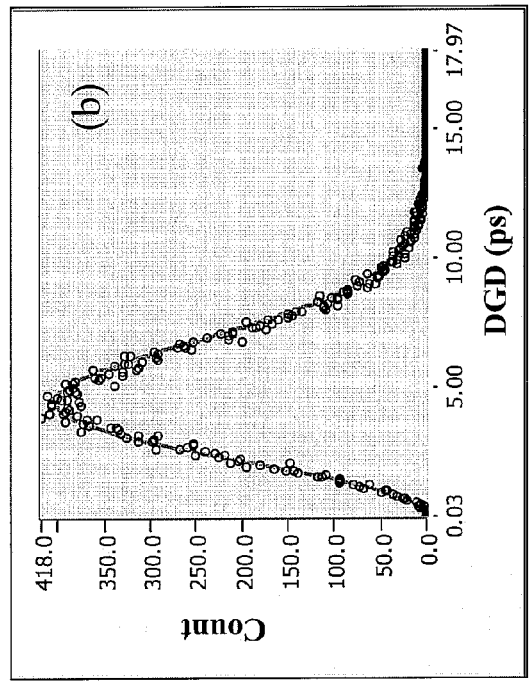
FIGS. 3A-3D are graphs demonstrating measured statistics of the all-fiber PMD emulator using the combinatorial polarization scramblers.
Figure 3B:
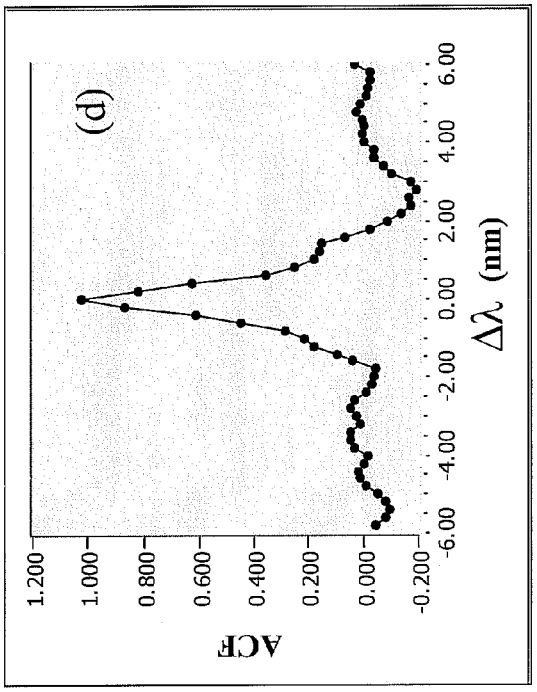
Figure 3C:
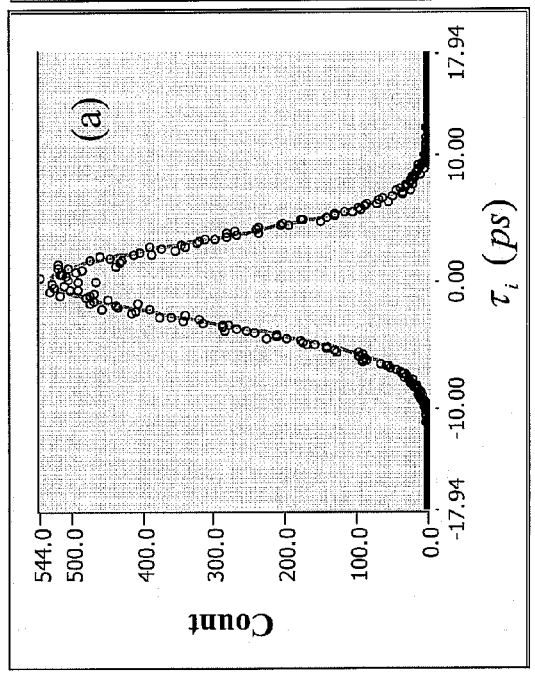
Figure 3D:
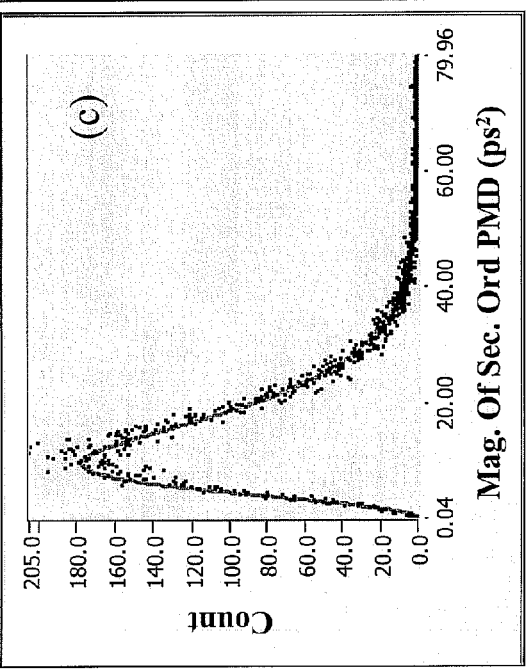

To improve the statistics, one combines the 350 wavelength samples of all the 100 fiber realizations to get a sample size of 35,000. FIG. 3A shows the distribution of one of the components of the PMD vector. It agrees well with the expected Gaussian distribution shown in the solid curve. Similarly, the other components of the PMD vector also follow this Gaussian distribution. FIG. 3B shows the distribution of the DGD which agrees very well with the theoretical Maxwellian distribution depicted in the solid curve. FIG. 3C shows the distribution of the magnitude of the second order PMD. All of the theoretical distributions shown as solid curves use the same mean DGD value of 5 ps as their fitting parameter. The frequency autocorrelation function of the emulator, as shown in FIG. 3D, indicates that outside the bandwidth of 1.2 nm, the PMD vectors are no longer correlated, thus the emulator is suitable for WDM applications. This 1.2 nm corresponds to between 6 to 7 times the PSP bandwidth of the emulator which is in good agreement with the other established theoretical results. It is worthwhile to note that fiber squeezing of PM fiber is not new. What is new is that one is able to reduce the required number of fiber squeezers by as much as an order of magnitude using different combinations of the fiber squeezers, and still achieving a good emulator's statistics.

The invention proposes a new approach for doing polarization scrambling between segments in a many-segment PMD emulator. It exploits the principles that rotation matrices are non-commutative and that there are numerous possible combinations of a few phase-plates for use in generating a polarization scrambler. With this combinatorial polarization scrambler approach, one can demonstrate numerically and experimentally that good PMD statistics is still achievable when the number of phase-plate is reduced by as much as an order of magnitude. This can substantially reduce the cost, the size and the complexity of controlling the emulator. The ease of implementation is also shown by the fact that our emulator was built in less than 3 hours. This combinatorial approach can also be adopted for emulators using thermal tuning, wave-plates and polarization controllers using paddles.

Although the present invention has been shown and described with respect to several preferred embodiments thereof, various changes, omissions and additions to the form and detail thereof, may be made therein, without departing from the spirit and scope of the invention.

What is claimed is:

1. A method of forming a polarization maintaining dispersion (PMD) emulator:
   providing at least two polarization phase plates;
   providing a polarization maintaining fiber (PM) with sufficient polarization scrambling between said at least two polarization phase plates;
   forming a plurality of loops by passing through a different sequence of said at least two phase plates using said PM fiber, and
   varying the birefringence of said at two phase plates to produce effective polarization scrambling between said loops.

2. The method of claim 1 further comprising the step of providing a plurality of polarization scramblers to form a PMD emulator.

3. The method of claim 1, wherein said PMD emulator comprises a plurality of birefringent segments.

4. The method of claim 2, wherein each of said polarization scramblers and said birefringent segments comprise different combinations said at least two phase-plates.

5. The method of claim 2, wherein said scramblers comprise a plurality of squeezers, wherein each said loops passes through a different sequence of said squeezers that creates different polarization scramblers between said loops and said PM fiber.

6. The method of claim 5, wherein said scramblers comprise randomly oriented tunable phase.

7. A polarization maintaining dispersion (PMD) emulator comprising at least two polarization phase plates, a polarization maintaining fiber (PM) having sufficient polarization scrambling between said at least two phase plates, a plurality of loops passing through a different sequence of said at least two phase plates using said PM fiber wherein the birefringence of said at two phase plates is varied to produce effective polarization scrambling between said loops.

8. The PMD emulator of claim 7 further comprising a plurality of polarization scramblers to form a PMD emulator.

9. The PMD emulator of claim 7, wherein said PMD emulator comprises a plurality of birefringent segments.

10. The PMD of claim 8, wherein each of said polarization scramblers and said birefringent segments comprise different combinations said at least two phase-plates.

11. The PMD emulator of claim 8, wherein said scramblers comprise a plurality of squeezers, wherein each loop passes through a different sequence of said squeezers that creates different polarization scramblers between said loops and said PM fiber.

12. The PMD emulator of claim 11, wherein said scramblers comprise randomly oriented tunable phase.

* * * * *